United States Patent [19]
Johnson, Jr.

[11] Patent Number: 4,594,757
[45] Date of Patent: Jun. 17, 1986

[54] MACHINE FOR REBUILDING DRIVE SHAFTS

[76] Inventor: Royce O. Johnson, Jr., P.O. Box 5899, Pine Bluff, Ark. 71611

[21] Appl. No.: 619,312

[22] Filed: Jun. 8, 1984

[51] Int. Cl.$^4$ .................. B23P 23/04; B23P 19/02; G01B 5/24
[52] U.S. Cl. .................. 29/33 K; 29/402.08; 29/426.4; 29/426.5; 29/525; 29/705; 29/721; 29/252; 33/180 R; 33/533; 33/550; 82/2 E; 82/59
[58] Field of Search .......... 82/2 E, 4 C, 53.1, 59, 82/61, 63, 64, 67–69, 70.2, 71, 72; 29/244, 252

[56] References Cited

U.S. PATENT DOCUMENTS

| | | | |
|---|---|---|---|
| 2,858,616 | 11/1958 | Swanson | 33/550 |
| 2,905,243 | 9/1959 | Rodder | 82/61 |
| 3,382,747 | 5/1968 | Breher | 82/59 |
| 3,724,303 | 4/1973 | Rinaldo | 82/59 |
| 4,276,685 | 7/1981 | Callahan | 29/252 |
| 4,295,276 | 10/1981 | Ellington, III | 29/407 X |
| 4,307,833 | 12/1981 | Barnard | 29/525 X |
| 4,369,679 | 1/1983 | Jones | 82/4 C X |

FOREIGN PATENT DOCUMENTS 631613  8/1963  Belgium .................. 33/174 Q

*Primary Examiner*—Gil Weidenfeld
*Assistant Examiner*—Steven C. Bishop
*Attorney, Agent, or Firm*—Harvey B. Jacobson; Clarence A. O'Brien

[57] ABSTRACT

An elongated work support comprising a table is provided and includes three side-by-side work stations extending longitudinally thereof. A first work station extends centrally along the table and includes a rotary support at one end of the table from which cutting structure is supported for adjustable shifting generally radially of the axis of rotation of the rotary support. The cutting station further includes support structure for stationary mounting a drive shaft tube in position concentric with the axis of rotation of the rotary support and with one end portion of the tube positioned relative to the cutting structure for cutting of an end member from the tube. The other end of the table includes drive shaft end member and tube end engaging structure relatively shiftable lengthwise of the table whereby an end member may be separated from an associated tube end. A second station is disposed adjacent one longitudinal side edge of the table and is operable to rotatably support a drive shaft tube and to test the tube as well as an end member supported from one end thereof for straightness and proper alignment. A third station disposed along the opposite longitudinal side of the table includes structure for slidably supporting the drive shaft center tube section, abuttingly engaging one end member from the free end thereof and supporting and displacing the other end member toward the opposite drive shaft end in order to seatingly telescopingly engage the mounting shank portion of the other end member in the adjacent tube section end.

9 Claims, 25 Drawing Figures

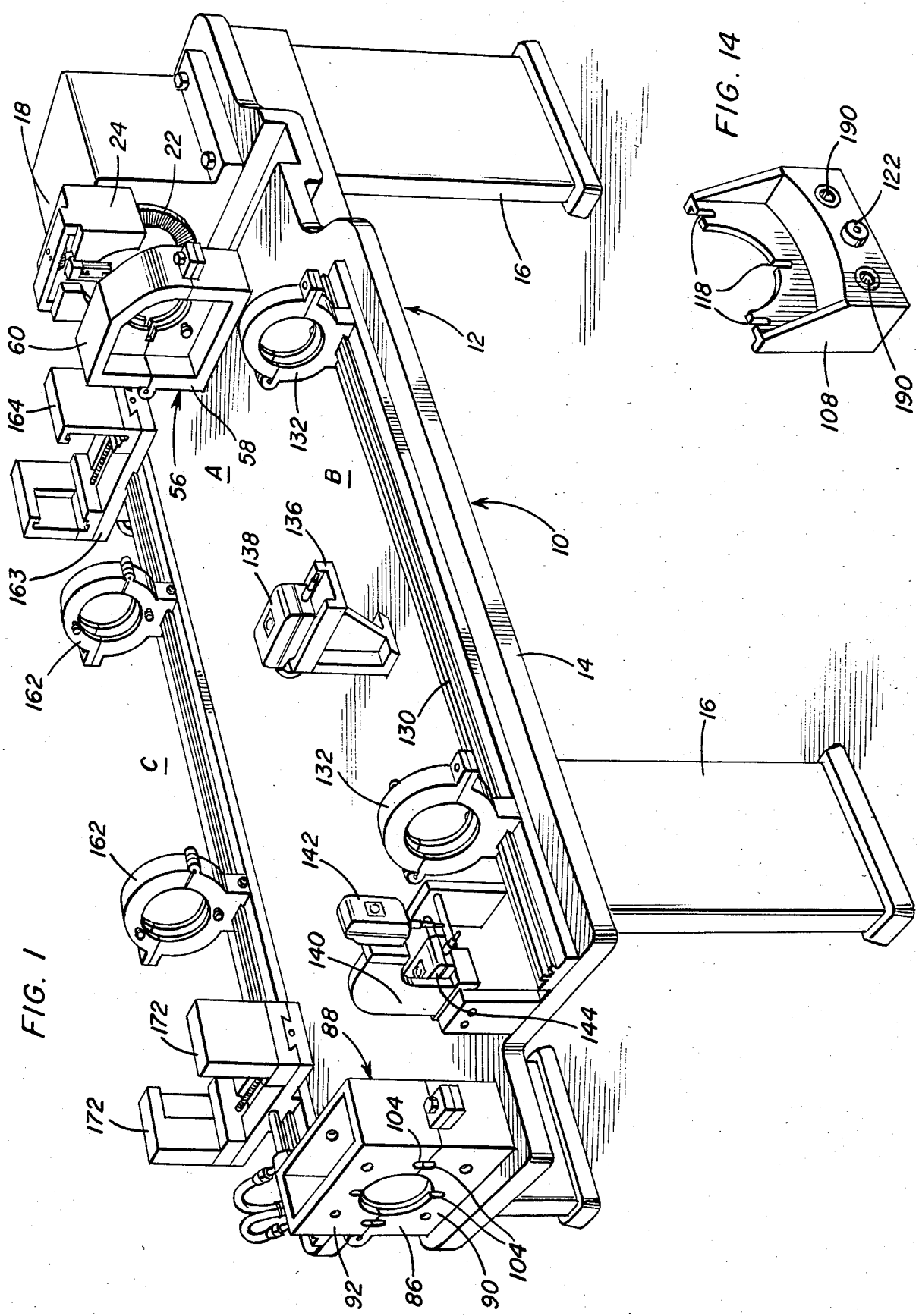

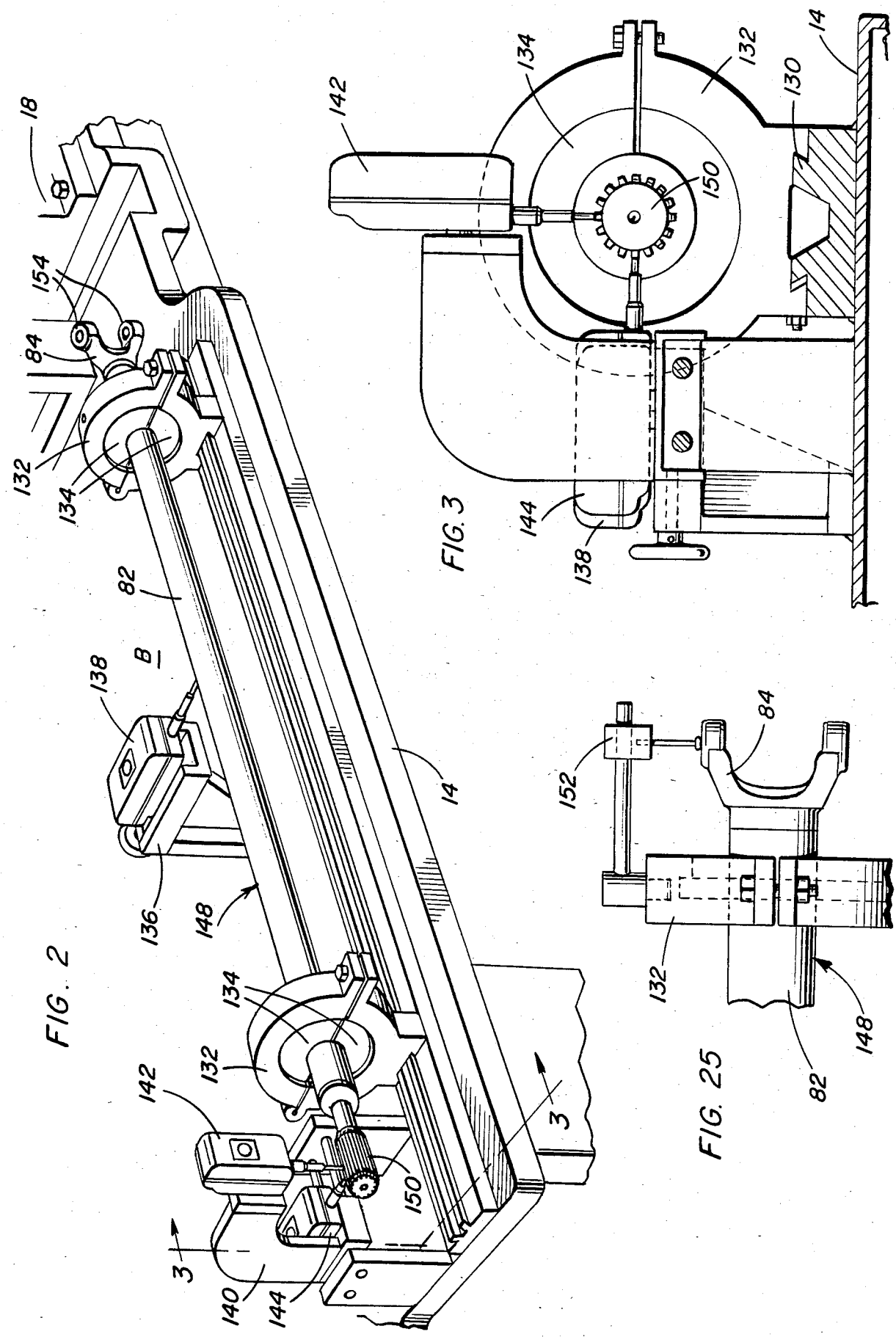

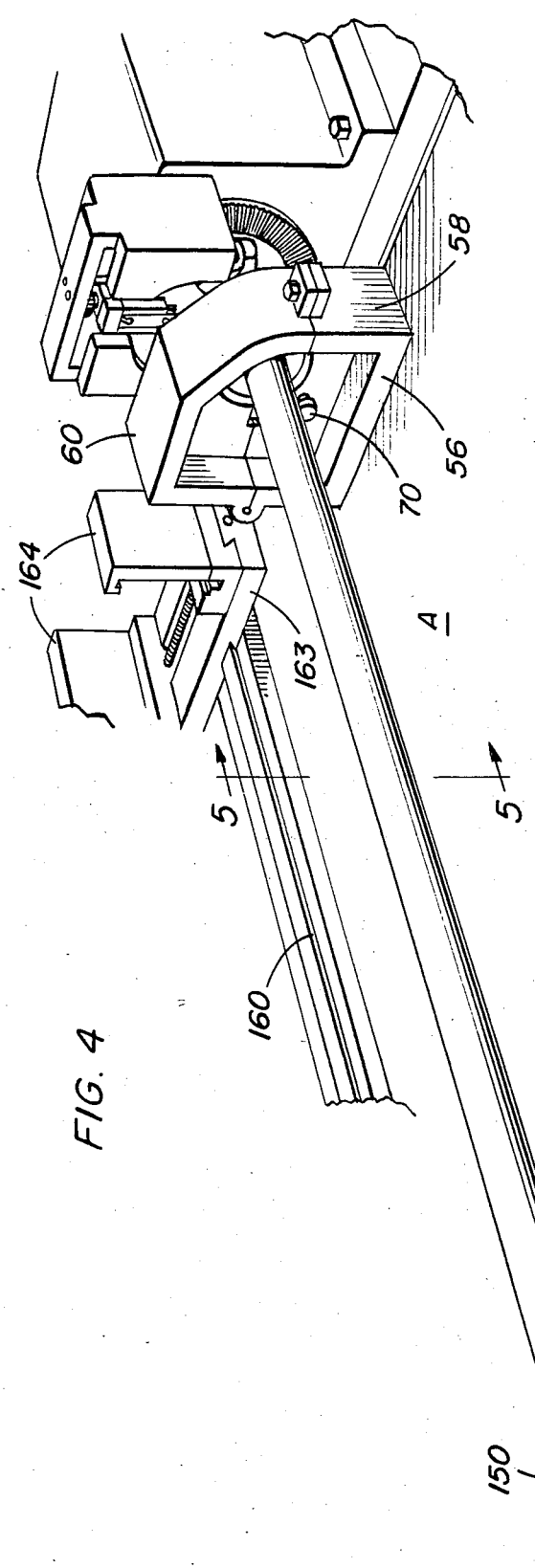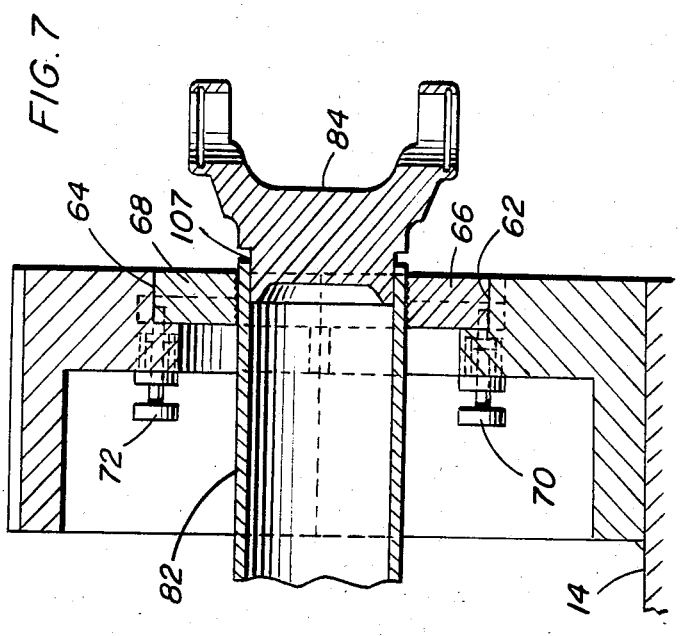

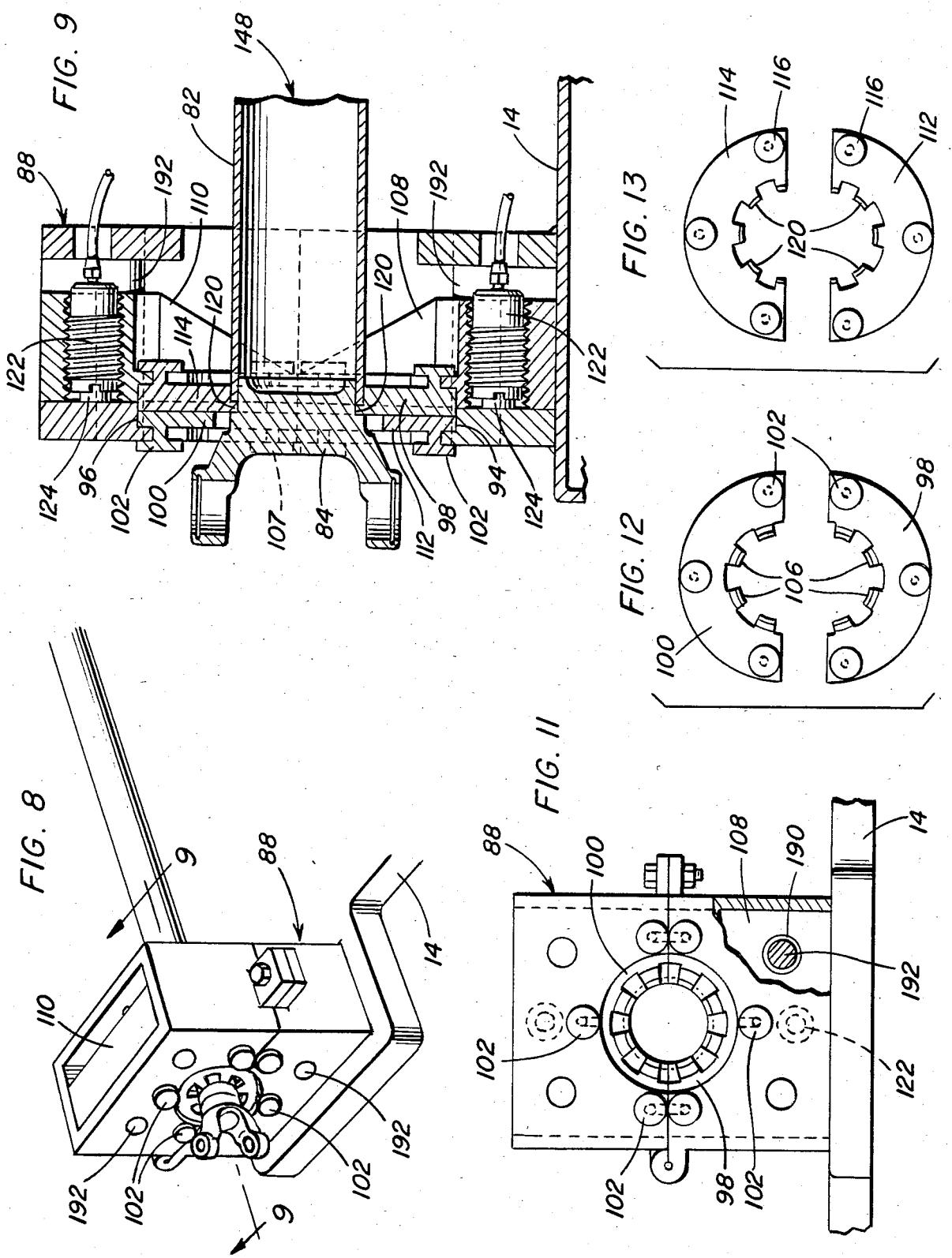

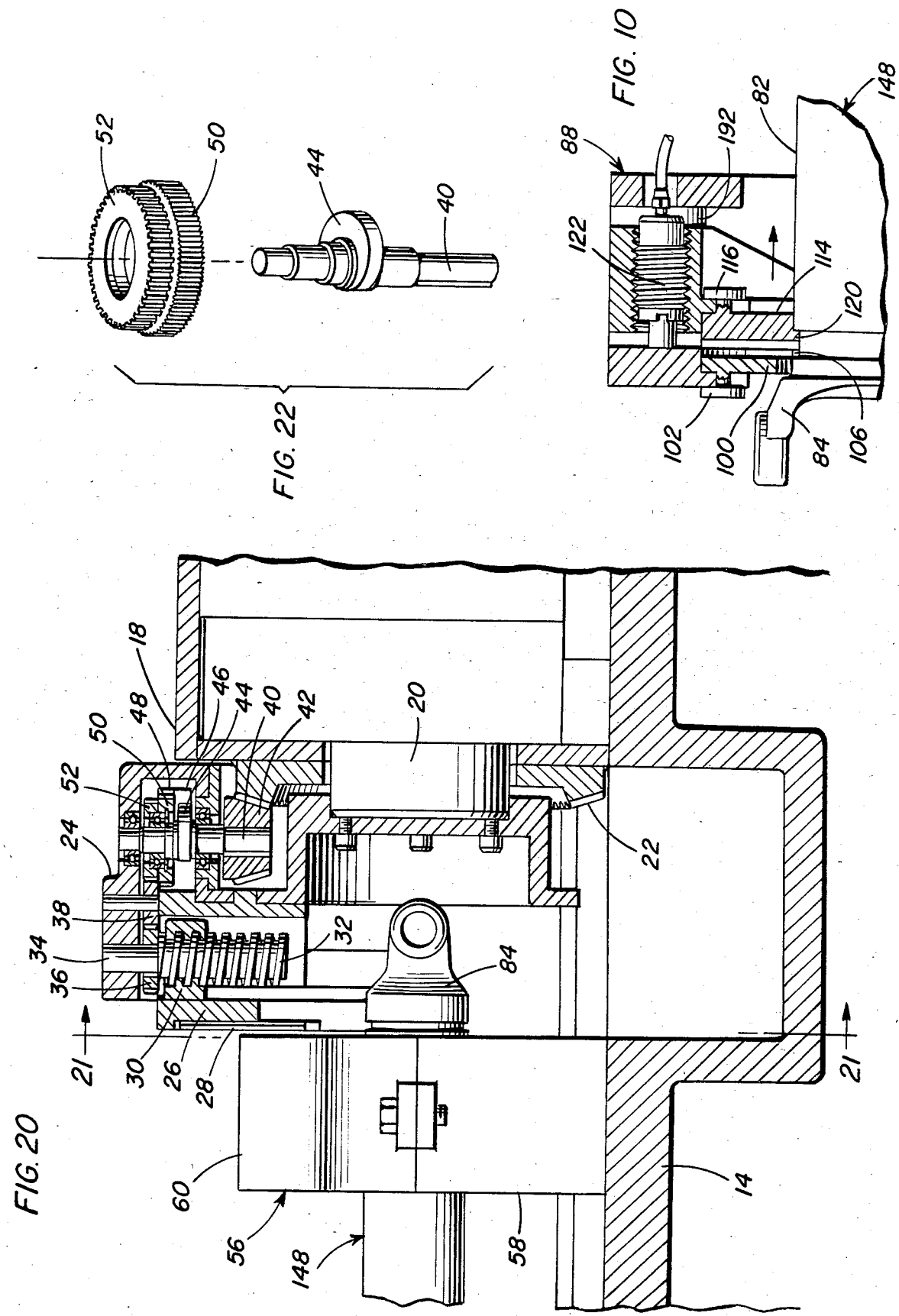

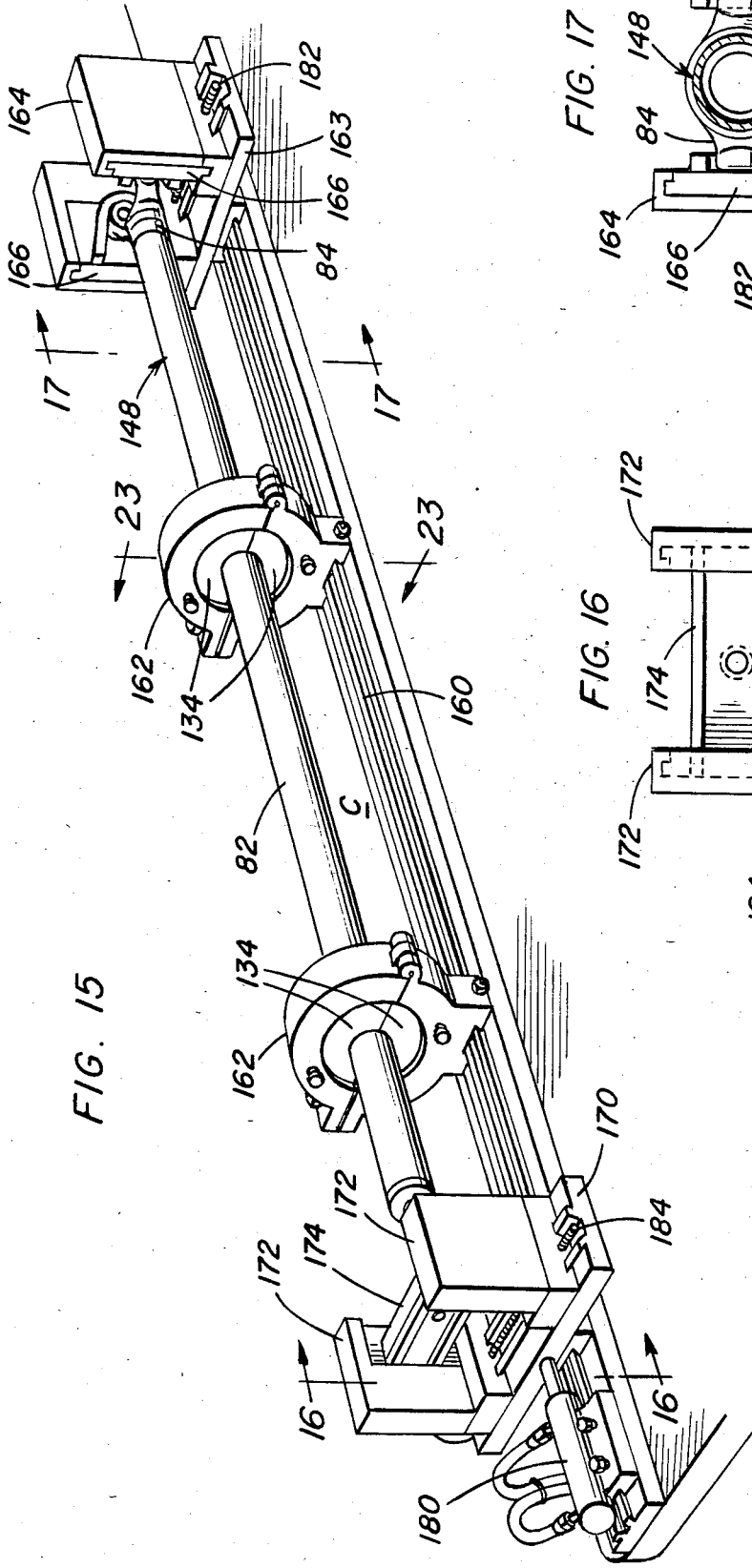
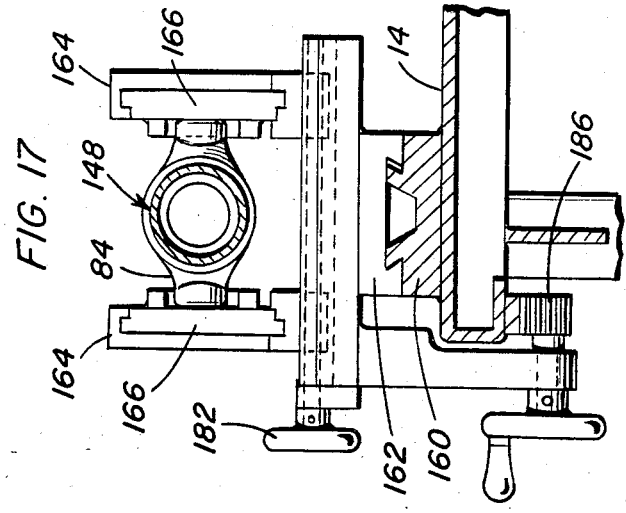
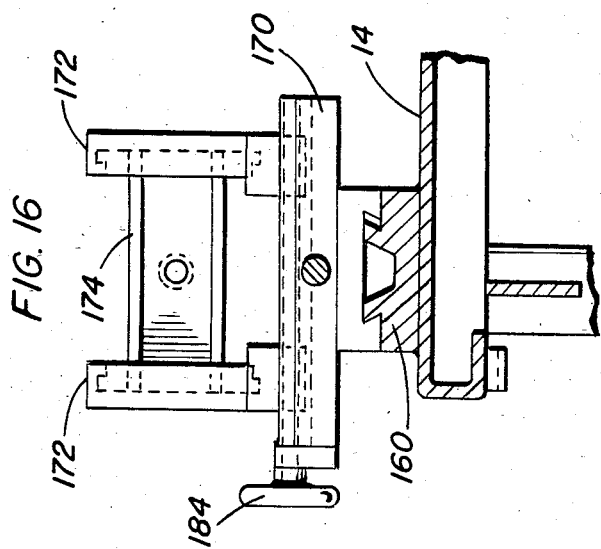
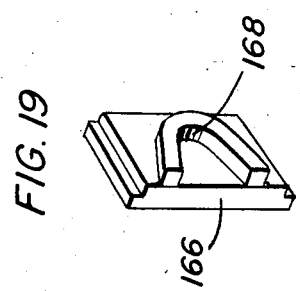
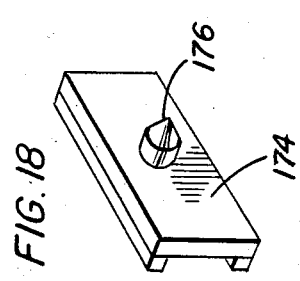

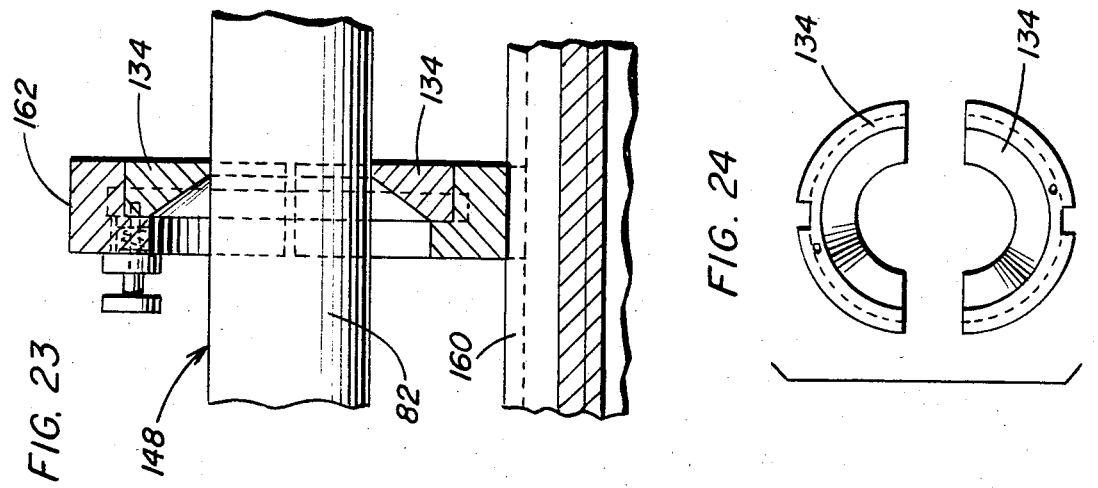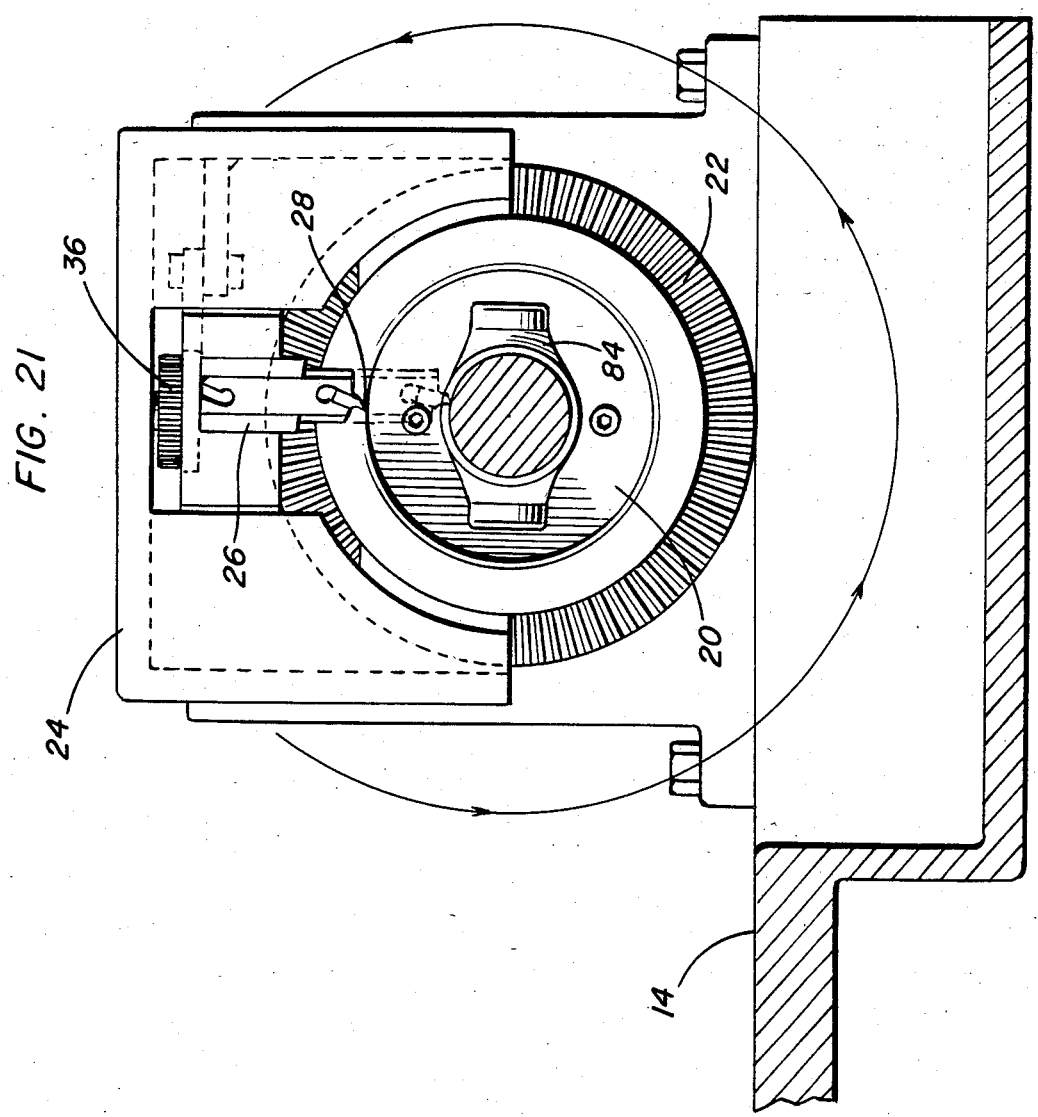

MACHINE FOR REBUILDING DRIVE SHAFTS

BACKGROUND OF THE INVENTION

Drive shafts conventionally used on motor vehicles consist of three components including a center tube section and a pair of opposite end torque transmitting members each including a shank portion snugly and seatingly telescopingly engaged within the corresponding tube member end. Each of the end members and the adjacent end edge of the tube member are peripherally welded together. When either an end member or a center tube section of a drive shaft are to be replaced, at least one end member of the drive shaft must be cut from the corresponding tube section end, axially displaced from engagement therewith and then replaced, if necessary. In addition, if the tube section is to be replaced, both end members must be cut therefrom and a new tube section must be installed between the two end members.

The repair of drive shafts in this manner is presently carried out through the utilization of an engine lathe upon which one or both end members may be cut from the corresponding tube member. After the necessary cut is made, the end member or component is then manually driven out of the center tube section and may be subsequently replaced. Drive shaft rebuilding is considerably less expensive than the purchase of a new drive shaft and in many instances considerably less inventory is required by a drive shaft rebuilder to make up any desired drive shaft than the inventory required by a drive shaft wholesaler to maintain a supply of each type of drive shaft which might be ordered.

Accordingly, the provision of an apparatus which may be used to precision rebuild, or construct from scratch, substantially any drive shaft in an efficient and time consuming manner is highly desirable. Further, if such an apparatus may be provided and operated more efficiently and quickly than an engine lathe, considerable additional savings may be realized in cost of equipment and man-hours required to rebuilt or construct new drive shafts.

Various different forms of tubular member cutting and joining tools as well as tools for pulling various end members from shaft ends heretofore have been provided such as those disclosed in U.S. Pat. Nos. 2,842,283, 3,003,231, 2,299,447, 3,722,778, 3,731,381 and 4,316,316. However, these previously known devices are not specifically designed to accomplish drive shaft rebuilding and constructing operations with the efficiency and savings in time possible with the drive shaft rebuilding machine of the instant invention.

BRIEF DESCRIPTION OF THE INVENTION

The drive shaft rebuilding machine includes relatively simple structure for cutting the end member from a drive shaft tube, axially separating the end member from the tube, testing the tube for straightness, reinstalling a new end member in the tube and testing the alignment of the end member in the tube prior to the final welding of the end member in the associated tube end. The various structures for supporting the center tube section and engaging drive shaft end members each include removable collets for supporting and engaging different size drive shaft components and, accordingly, the drive shaft rebuilding machine may be used to rebuild substantially any drive shaft. Further, the various drive shaft tube and end member supporting components are adjustable to accommodate drive shafts of different lengths. Also, the cutting structure by which the machine functions to cut an end member from an associated center tube section end is constructed in a manner whereby the depth of cut may be automatically terminated and whereby the cut being made is progressively deepened in incremental steps during the cutting operation.

The main object of this invention is to provide a machine which may be used to efficiently and inexpensively rebuild drive shafts in a minimum of time.

Another object of this invention is to provide an apparatus which may also be used to construct new drive shafts from a supply of drive shaft center tube and end member components.

Still another object of this invention is to provide a machine for rebuilding drive shafts and which may be readily adapted for use in conjunction with drive shafts of various different diameters and lengths.

Another object of this invention is to provide a drive shaft rebuilding machine which may be used to remove and install drive shaft end members on corresponding ends of drive shaft center tube sections independent of the use of impact tools such as hammers thereon.

A final object of this invention to be specifically enumerated herein is to provide a drive shaft rebuilding machine in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the overall drive shaft rebuilding machine of the instant invention;

FIG. 2 is an enlarged fragmentary perspective view of the near side of the drive shaft rebuilding machine illustrated in FIG. 1 and illustrating the manner in which the straightness of the drive shaft center tube member and alignment of a drive shaft end member may be tested both prior to and during rebuilding of the drive shaft;

FIG. 3 is an enlarged transverse vertical sectional view taken substantially upon the plane indicated by the section line 3—3 of FIG. 2;

FIG. 4 is an enlarged fragmentary perspective view illustrating the portion of the machine which is utilized to cut a drive shaft end member from the adjacent drive shaft tubular member end;

FIG. 5 is an enlarged fragmentary vertical sectional view taken substantially upon the plane indicated by the section line 5—5 of FIG. 4;

FIG. 6 is an exploded elevational view of the work holding collets removably supported from the structure illustrated in FIG. 5;:

FIG. 7 is an enlarged fragmentary vertical sectional view illustrating the manner in which the removable work holding collets are used to stationarily clamp a drive shaft center tube section end stationary relative to the cutting structure preparatory to removal of a drive shaft end member from the center tube section;

FIG. 8 is a fragmentary enlarged perspective view of the exterior of the end member and tube section parting structure used to separate an end member from the adjacent tube member end after the cutting operation has been completed;

FIG. 9 is an enlarged fragmentary vertical sectional view taken substantially upon the plane indicated by the section line 9—9 of FIG. 8;

FIG. 10 is a fragmentary englarged vertical sectional view of the upper structure illustrated in FIG. 9;

FIG. 11 is an enlarged elevational view of the structure illustrated in the left-hand portion of FIG. 8 and with the associated drive shaft removed and portions of the structure being broken away and illustrated in vertical sections;

FIGS. 12 and 13 are exploded elevational views of the male and female, respectively, removably received in the structure illustrated in FIG. 8 and shiftable relative to each other to effect a drive shaft end member and center tube section parting operation;

FIG. 14 is a perspective view of a typical extractor collet holder such as that illustrated in FIG. 9;

FIG. 15 is a fragmentary enlarged perspective view of the reinstalling station of the machine;

FIG. 16 is an enlarged fragmentary vertical sectional view taken substantially upon the plane indicated by the section line 16—16 of FIG. 15;

FIG. 17 is an enlarged fragmentary vertical sectional view taken substantially upon the plane indicated by the section line 17—17 of FIG. 15;

FIG. 18 is a perspective view of a spline end member engaging abutment plate of the reinstalling station;

FIG. 19 is a perspective view of a yoke end member engaging abutment plate utilized in the reinstalling station;

FIG. 20 is an enlarged fragmentary vertical sectional view taken substantially upon a plane passing through the center axis of the cutting station disposed at the right side of FIG. 1;

FIG. 21 is a vertical sectional view taken substantially upon the plane indicated by the section line 21—21 of FIG. 20;

FIG. 22 is an exploded perspective view of two of the components involved in the cutter feed screw actuating mechanism of the drive shaft rebuilding machine;

FIG. 23 is an enlarged fragmentary vertical sectional view taken substantially upon the plane indicated by the section line 23—23 of FIG. 15;

FIG. 24 is an exploded elevational view of the drive shaft tube section supporting collets illustrated in FIG. 23; and FIG. 25 is an enlarged fragmentary elevational view illustrating the use of a dial indicator to check the position of the arms on the yoke member.

DETAILED DESCRIPTION OF THE INVENTION

Referring now more specifically to the drawings, the numeral 10 generally designates the overall drive shaft rebuilding machine of the instant invention. Machine 10 includes a table referred to in general by the reference numeral 12 and incorporating a generally rectangular tabletop 14 provided with four depending corner legs 16. The machine 10 defines three side-by-side elongated and longitudinally extending stations A, B and C spaced transversely of the tabletop 14 and with the stations C and B extending along opposite longitudinal edges of the tabletop 14 and station A extending generally along the longitudinal center line of the tabletop 14.

The station A includes opposite ends disposed at opposite ends of the tabletop 14. One end of the station A defines a cutting station 18 including rotary head 20 and a stationary ring gear 22. The rotary head 20 mounts a support structure 24 therefrom and a tool holder 26 is guidingly supported from the support structure 24 for shifting radially of the axis of rotation of the head 20. The tool holder mounts a cutting tool 28 therefrom and is equipped with a nut 30 with which a feed screw 32 is threadedly engaged. The feed screw 32 is mounted on a shaft 34 journalled from the support structure 24 and the feed screw includes a driven gear 36 with which an intermediate gear 38 journalled from the support structure 24 is meshed. A drive shaft 40 is journalled from the support structure 24 and extends generally radially of the axis of rotation of the head 20. The drive shaft 40 includes a bevelled gear 42 mounted on its lower end meshed with the ring gear 22 and an intermediate length portion of the drive shaft 40 includes a cam lobe 44 thereon engageable with a spring biased and pivotally mounted pawl 46 oscillatable relative to the support 24 and including a toothed pawl portion 48 engageable with the toothed periphery of a ratchet wheel 50 journalled on the shaft 40 and having a gear wheel 52 integral therewith meshed with the intermediate gear 38. The bevelled gear 42 is keyed to the shaft 40 for rotation therewith, as is cam lobe 44, and one complete revolution of the drive shaft will cause the pawl 48 to advance the ratchet wheel 50 and thus the gear wheel 52, an angular extent equal to the spacing between adjacent ratchet teeth on the periphery of the ratchet wheel 50. Accordingly, rotation of the head 20 relative to the ring gear 22 will cause the feed screw 32 to be incrementally angularly displaced each time the drive shaft 40 makes one complete revolution.

The upper end of the shaft 34 may include a hand crank (not shown) for manually turning the shaft 34 and the pawl 46 may include a release mechanism (not shown) to enable manual adjustment of the nut 30 and thus the tool holder 26 independent of rotation of the head 20. Further, the pawl 46 may include control structure (not shown) whereby rotation of the feed screw 32 to advance the nut 30 downwardly as viewed in FIG. 20 may be terminated at any desired depth of cut.

The cutting station additionally includes a first work holder assembly generally referred to by the reference numeral 56 and including a stationary lower portion 58 and a hinged upper portion 60. The lower and upper portions 58 and 60 include opposing grooved semi-cylindrical recesses 62 and 64 formed therein, see FIG. 7, in which a pair of semi-circular work holding collets 66 and 68, respectively, are removably seatingly receivable and secured in position within the lower and upper portions 58 and 60 by spring biased keeper pins 70 and 72 reciprocately supported from the portions 58 and 60 and removably engageable in keeper bores 74 and 76 formed in the work holding collets 66 and 68. The work holding collets 66 and 68 include outer peripheral positioning notches 77 and serrated semi-cylindrical inner peripheral surfaces 78 and 80 for tightly gripping the exterior of one end of a drive shaft center tube section 82 from which an end member such as the yoke end member 84 illustrated in FIG. 7 is to be removed by initially cutting the attaching weld securing the end member 84 to the tube section 82 and subsequently extracting the end member 84 from the tube section 82 at the extraction station 86 defined at the end of the tabletop 14 remote from the cutting station 18.

The extractor station 86 includes a work holding assembly referred to in general by the reference numeral 88 and which is not unlike the work holding assembly 56. The work holding assembly 88 includes a stationary lower portion 90 and a hinged upper portion 92. The lower and upper portions 90 and 92 define opposing semi-cylindrical recesses 94 and 96 in which upper and lower semi-annular male extracting collets 98 and 100 are removably receivable. The collets 98 and 100 included headed positioning pins 102 engageable in slots 104 provided therefor in the lower and upper portions 90 and 92. The collets 98 and 100 include radially inwardly projecting offset fingers 106 engageable within a circumferential cut 107 made by the cutting tool 28 in a manner to be more fully set forth. In addition, the lower and upper portions 90 and 92 slidingly support lower and upper collet holders 108 and 110 therein, see FIG. 9, and the collet holders 108 and 110 removably support lower and upper semi-annular extractor collets 112 and 114 therefrom.

The collets 112 and 114 include headed positioning pins 116 corresponding to the pins 102 and which are receivable in slots 118 similar to the slots 104. The collets 112 include inwardly projecting fingers 120 which are angularly offset relative to the fingers 106 and the inner ends of the fingers 106 and 120 are receivable within the cut 107 so that movement of the collet holders 108 and 110 to the right when viewed in FIG. 9 will effectively separate the end of the tube section 82 from the end member 84. The offset of the fingers 106 enables all of the fingers 106 and 120 to be disposed in the plane of the cut 106 and to therefore be seated within the cut 107. The collet holders 108 and 110 each threadedly support a short hydraulic cylinder 122 therefrom and each hydraulic cylinder 122 includes an extendible piston portion 124 which may be extended to shift the corresponding collet holder to the right as viewed in FIG. 9 to thereby separate the tube section 82 from the end member 84.

The collet holders 110 and 108 include guide sleeves 190 secured therethrough guidingly mounted upon guide shafts 192 extending between spaced opposing walls of the lower and upper portions 90 and 92 of the work holder assembly 88.

Station B comprises a test station which may be used to determine what portion or portions of a drive shaft need to be replaced. In addition, the test station may be used to check the alignment of an end member reinstalled relative to a corresponding end of a drive shaft tube section immediately prior to the end member being finally welded in position on the tube section.

The test station B includes a guideway 130 extending longitudinally therealong upon which a pair of hinged and clamp-type collet holders 132 are slidably mounted. Suitable structure such as set screws (not shown) may be used to releasably retain the collet holders 132 in adjusted postions along the guideway 130. The collet holders 132 removably support semi-annular collets 134 therefrom and the collets 134 are used to slidably and rotatably support opposite ends of the tube section 82 therefrom. The test station B includes a first stationary mount 136 from which a dial indicator 138 is mounted for adjustable shifting along a horizontal path transverse to and intersecting with longitudinal center axis of the tube section 82 and a second support 140 guidingly shiftable longitudinally of the tabletop 14 from which second and third dial indicators 142 and 144 are mounted. The dial indicator 142 is vertically shiftable along a path intersecting with the longitudinal center axis of the tube 82 and the dial indicator 144 is horizontally shiftable along a path intersecting with the center axis of the tube section 82.

When the drive shaft 148 including the tube section 82 is supported from the two pairs of collets 134 removably supported from the collet holders 132, the drive shaft 148 may be gradually rotated with the dial indicator 138 engaged with the center portion of the tube section 82 in order to indicate any lateral deflection of the portion of the tube section 82 with which the dial indicator 138 is engaged. In addition, with the tube section ends stationarily clamped between the collets 134, the dial indicators 142 and 144 may be adjusted to contact the splined end member 150 of the drive shaft 148 and the support 140 may be shifted longitudinally of the tabletop 14 in order to indicate any misalignment of the end member 150 relative to the center axis of the tube section 82. This testing of the drive shaft 148 may be carried out to determine if the tube section 82 is straight and if the end member 150 is properly aligned with the tube section 82. In addition, a fourth dial indicator 152 may be supported from the collet holder 132 adjacent the cutting station 18 and utilized to check the relative positions of the free ends of the arms 154 of the yoke end member 84 mounted on the end of the tube section 82 remote from the end member 150.

With attention now invited more specifically to FIGS. 1 and 15 of the drawings, it may be seen that the station C includes a guideway 160 corresponding to the guideway 130 and from which a pair of collet holders 162 corresponding to the collet holders 132 are adjustably supported. The collet holders 162 also include removable collets 134 and may slidingly or clampingly engage longitudinally spaced portions of the tube section 82 of the drive shaft 148. A first work holder 163 is also guidingly supported from the guide holder 160 adjacent the cutting station 18 and includes inversely laterally shiftable jaws 164 shiftably supported therefrom. The jaws 164 removably support yoke arm end seat plates 166 therefrom and the plates oppose each other and define recesses 168 opening horizontally toward the remote end of the guideway 160 and in which the free ends of the arms 154 of the yoke end member 84 are seatingly receivable.

A second work holder 170 is slidably supported from the end of the guideway 160 remote from the cutting station 18 and includes inversely laterally shiftable jaws 172 between which a splined end member engaging abutment plate 174 is supported for vertically shifting relative to the jaws 172. The plate 174 includes a conical tip equipped center pin 176 seatingly engageable in the center end recess 178 formed in the free terminal end of the splined end member 150. Further, a double acting hydraulic cylinder 180 is adjustably stationarily mounted along the guideway 160 and engages the work holder 170 for forcible shifting work holder 170 toward the work holder 163.

The various collets 66 and 68, 98 and 100, 112 and 114 and also the collets 134 are, of course, constructed of an inner peripheral radius of curvature according to the diametric size of the tube section to be worked upon. Further, the plates 166 are also offered in different sizes to accommodate different size arm ends of different yoke end members.

The jaws 164 are adjustable toward and away from each other by an adjusting screw 182 and the jaws 172 are adjustable toward and away from each other by adjusting screw 184. Further, the work holder 163 is quickly shiftable along the guideway 160 by a rack and pinion gear drive 186 and the rack and pinion gear drive may be releasably locked in adjusted position by any suitable latch means (not shown).

In operation, if the drive shaft 148 is merely to be checked for vibration, it may be supported at station B in the manner illustrated in FIG. 2 of the drawings in order to check the tube section 82 for straightness and to check the end members 150 and 84 for alignment with the tube section 82 and for possible bending, also see FIG. 25.

If on the other hand, either end member 84 or 150 must be replaced, the drive shaft 148 is supported at station A as illustrated in FIG. 4 and clamped in position by the work holding assembly 56 after the proper work holding collets 66 and 68 have been selected, according to the diameter of tube section 82, see also FIGS. 6, 5 and 7. Thereafter, the cutting station 18 is actuated and the cutting tool 28 forms the cut 107 through the welding (not shown) which previously secured the end member 84 to the tube section 82. After the cut 107 has been made, the drive shaft is mounted in the work holding assembly 88 in the manner illustrated in FIGS. 8 and 9, also see FIGS. 11, 12 and 13, with the correct collets 98, 100, 112 and 114 engaged in the cut 107. Thereafter, the hydraulic cylinders 122 are actuated in order to extract the end member 84 from the adjacent end of the tube section 82. Then, the drive shaft 148 is mounted at station C as illustrated in FIG. 15 of the drawings, also see FIGS. 16, 17, 18 and 19 with a new yoke end member 84 having the free ends of its arms seated in the recesses 168 of a pair of plates 166 selected according to the size of the yoke end member. Thereafter, with the abutment plate 174 engaged with the end member 150, the cylinder 180 may be actuated in order to reduce the distance between the work holders 163 and 170 and thereby press the shank portion of the new yoke end member 84 into the adjacent end of the tube section 82. After the new yoke end member has been installed, the drive shaft 148 may be returned to station B in order that the alignment of the newly installed yoke end member may be checked preparatory to final welding of the new yoke end member in place.

Of course, if both end members of the drive shaft 148 need to be replaced, both end members must be cut and extracted from the tube section 82. This is also true if only the tube section 82 needs to be replaced.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A drive shaft rebuilding machine including a mount, a support and cutting station including support means on said mount for stationarily supporting therefrom a drive shaft including a center tube section and opposite end torque transmitting end members having shank portions telescoped into and welded to the opposite ends of said tube section by peripheral weld zones, said support and cutting station including cutting means operative to peripherally precisely depth cut-away a selected weld zone and separation means operative to axially separate said tube section from the end member on the side of said zone remote from said tube section, a test station mounted on said support and including axially spaced journaled means on said support for journalling opposite end portions of said center tube section therefrom, said test station additionally including lateral deflection sensing and indicating means intermediate said journal means for sensing and indicating lateral deflection of the longitudial midportion of said center tube section during rotation of said center tube section relative to said journal means and misalignment sensing and indicating means for sensing and indicating misalignment of the end members at opposite ends of said center tube section, a reinstaller station including a pair of axially spaced supports on said mount for slidably supporting a center tube section from its opposite end portions for at least limited guided axial shifting of said center tube section relative to said supports, first and second abutment means on said mount spaced outward from remote sides of said supports, said abutment means including means for supportively engaging remote extremities of said torque transmitting end members in alignment with the center axis of a center tube section supported from said supports, one of said supports being stationarily mounted from said mount and means supporting the other of said supports from said mount for guided rectilinear shifting toward and away from said one support, and means operative to gradually forcible shift said other support toward said one said support.

2. The machine of claim 1 wherein said one support is also guidingly supported from said mount for guided rectilinear shifting toward and away from the other support, and means operative to releasably lock said one support in adjusted shifting position relative to said mount.

3. The machine of claim 1 wherein said means for supportively engaging one of said remote extremities includes a conical torque transmitting member extremity engaging tip facing toward the other support and adapted to be seated in a central end recess formed in an opposing end member extremity.

4. The machine of claim 1 wherein said means for supportively engaging one of said remote extremities includes a pair of opposing surfaces disposed on opposite sides of a center path extending between said supports and means defining horizontally opening generally U-shaped recesses opening toward the remote support with at least portions of said opposing surfaces defining the remote limits of said recesses.

5. The machine of claim 4 wherein said means for supportively engaging the other of said remote extremities includes a conical torque transmitting member extremity engaging tip facing toward said one support and adapted to be seated in a central end recess formed in an opposing end member extremity.

6. The machine of claim 1 wherein said mount includes an elongated horizontal support table, said stations occupying elongated zones of said table extending longitudinally thereof and spaced transversely apart across said table.

7. The machine of claim 1 wherein said means for stationarily supporting a drive shaft from said mount includes means operative to engage and axially separate one of said end torque transmitting members from said center tube section after the corresponding weld zone has been cut-away.

8. The machine of claim 1 wherein said cutting means includes a rotary mount, said support means including support structure for releasingly clampingly engaging and supporting one end portion of said tube section adjacent said rotary mount and with said tube section concentric with the axis of rotation of said mount, cutting means, cutting means support means carried by said rotary mount and supporting said cutting means from said mount for guided shifting generally radially of said axis, said cutting means supporting means including step feed means operative to fractionally step inwardly radially shaft said cutting means toward said axis each revolution of said rotary mount.

9. The machine of claim 1 wherein said test station includes a pair of spaced supports mounted on said mount and including predetermined tube section diameter tube section end portion support structures removably supported from said supports and operative to support opposite end portions of said tube section therefrom for rotation about the longitudinal center axis of said tube section, and dial indicator means supported intermediate said supports, adjustable radially of said axis and engageable with the tube section for indicating any deflection of the engaged portion of said tube section laterally of said axis.

* * * * *